United States Patent
Cherubini et al.

(10) Patent No.: US 9,449,638 B2
(45) Date of Patent: Sep. 20, 2016

(54) CONTROLLING THE TRANSPORT OF A TAPE WITHIN A TAPE TRANSPORT SYSTEM

(71) Applicant: International Business Machines Corporation, Armonk, NY (US)

(72) Inventors: Giovanni Cherubini, Rueschlikon (CH); Jens Jelitto, Rueschlikon (CH); Eiji Ogura, Tokyo (JP); Angeliki Pantazi, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 14/244,323

(22) Filed: Apr. 3, 2014

(65) Prior Publication Data

US 2014/0312154 A1 Oct. 23, 2014

(30) Foreign Application Priority Data

Apr. 19, 2013 (GB) .................................. 1307094.1

(51) Int. Cl.
| | |
|---|---|
| *G11B 15/46* | (2006.01) |
| *G11B 15/18* | (2006.01) |
| *G11B 15/43* | (2006.01) |
| *G11B 15/54* | (2006.01) |
| *G11B 15/44* | (2006.01) |

(52) U.S. Cl.
CPC ........... *G11B 15/46* (2013.01); *G11B 15/1875* (2013.01); *G11B 15/43* (2013.01); *G11B 15/54* (2013.01); *G11B 15/44* (2013.01)

(58) Field of Classification Search
None
See application file for complete search history.

(56) References Cited

U.S. PATENT DOCUMENTS

| | | | |
|---|---|---|---|
| 3,984,868 A | 10/1976 | Ragle et al. | |
| 4,386,381 A * | 5/1983 | Itai ............................ | G11B 5/54 242/333.6 |
| 5,032,938 A | 7/1991 | Tajima et al. | |
| 5,604,652 A * | 2/1997 | Nishida ................... | G11B 15/43 242/334.4 |
| 6,622,113 B2 * | 9/2003 | Koski ....................... | G01B 5/02 360/71 |
| 6,754,026 B1 | 6/2004 | Koski | |
| 2003/0156344 A1* | 8/2003 | Chliwnyj ................ | G11B 15/43 360/71 |
| 2004/0051991 A1 | 3/2004 | Koski | |
| 2009/0206190 A1 | 8/2009 | Bui et al. | |

(Continued)

FOREIGN PATENT DOCUMENTS

| | | |
|---|---|---|
| EP | 0570956 A2 | 11/1993 |
| EP | 0854479 A1 | 7/1998 |

(Continued)

OTHER PUBLICATIONS

UK Intellectual Property Office; Application No. GB1307094.1; Patents Act 1977: Search Report under Section 17(5); Date of Mailing: Sep. 30, 2013; pp. 1-6.

*Primary Examiner* — Tan X Dinh
(74) *Attorney, Agent, or Firm* — Cantor Colburn LLP

(57) ABSTRACT

A control device for controlling the transport of a tape within a tape transport system, the tape transport system having a head being operable to read data from and/or write data to the tape, an outboard reel and an inboard reel, wherein the tape is moveable from the outboard reel to the inboard reel in forward direction or from the inboard reel to the outboard reel in reverse direction, wherein the control device is adapted to generate control signals to control the velocity of the outboard reel and the velocity of the inboard reel as a function of a primary velocity of the tape at the head and a secondary velocity of the tape at the inboard reel and/or a secondary velocity of the tape at the outboard reel.

16 Claims, 7 Drawing Sheets

(56) References Cited

U.S. PATENT DOCUMENTS

| | | | |
|---|---|---|---|
| 2013/0016439 A1* | 1/2013 | Argumedo | G11B 15/32 360/73.07 |
| 2014/0063643 A1* | 3/2014 | Bui | G11B 5/00821 360/73.08 |
| 2014/0312154 A1* | 10/2014 | Cherubini | G11B 15/46 242/334 |
| 2015/0062744 A1* | 3/2015 | Cherubini | G11B 15/43 360/72.1 |
| 2015/0062747 A1* | 3/2015 | Lantz | G11B 15/602 360/77.12 |
| 2015/0325262 A1* | 11/2015 | Argumedo | G11B 5/584 360/76 |

FOREIGN PATENT DOCUMENTS

| | | |
|---|---|---|
| JP | 2000040277 A | 2/2000 |
| WO | 2012010498 A1 | 1/2012 |

* cited by examiner

CONTROLLING THE TRANSPORT OF A TAPE WITHIN A TAPE TRANSPORT SYSTEM

PRIORITY

This application claims priority to Great Britain Patent Application No. 1307094.1, filed Apr. 19, 2013, and all the benefits accruing therefrom under 35 U.S.C. §119, the contents of which in its entirety are herein incorporated by reference.

BACKGROUND

The invention relates to a device and to a method for controlling the transport of a tape within a tape transport system based on a primary velocity measurement of the tape and a secondary velocity measurement of the tape.

In modern tape storage systems, the capacity and performance of the tape storage systems have increased considerably. To achieve higher cartridge or tape capacities and improved performance, however, further advances in several areas are necessary. Increases in linear and track densities on the tape may be required in order to achieve higher storage capacities. However, increase in linear densities may lead to a decrease of the distance between adjacent bit cells, which in turn may lead to an increase of inter-symbol interferences. Increase in track densities may lead to narrower individual track widths and narrower write and/or read heads which may require a very precise control of the tape transport system and track-follow control of the tape head. Thus, reliable and precise tape transport is of importance to guarantee read-channel performance on all parallel data channels during tape operation.

To achieve a reliable and precise tape transport, tight control of tension and potentially of tape dimensional stability (TDS) variations may become necessary. This may lead to the use of thinner tape material, which in turn may enable an increase in volumetric density. Usually, the performance of the tape transport servomechanism and the quality of readback signals in data channels are affected by variations in the tape velocity and tension. For instance, during operation in cruise velocity mode, variations of tape velocity and tension around the nominal value, also called once-around, may be induced by reel eccentricities. This problem may become critical when the reel rotation frequencies are near the resonance frequency determined by the tape path.

Conventionally, for the tape transport operation, a dual servo channel provides estimates of the tape velocity, tape longitudinal position, and head lateral position, which are derived from servo signals that are read by servo readers in the head module. In current tape transport control systems, the tape velocity measured at the head using pre-formatted servo information, the so called primary velocity, is the only velocity information that is used for a velocity control during cruise mode. Hall sensors can be used to obtain secondary tape velocity information from the individual reels, which information is typically used to achieve proper tape transport operation in the absence of valid parameter estimates from the servo channel that provide the primary velocity measurement. This may be the case for instance during acceleration or deceleration of the tape. Such a system is for example disclosed in U.S. Pat. No. 6,754,026 B1.

SUMMARY

According to an embodiment of a first aspect, a control device for controlling the transport of a tape within a tape transport system is suggested. The tape transport system has a head being operable to read data from and/or write data to the tape, an outboard reel and an inboard reel, wherein the tape is moveable from the outboard reel to the inboard reel in forward direction, or from the inboard reel to the outboard reel in reverse direction. The control device is adapted to generate control signals to control the velocity of the outboard reel and the velocity of the inboard reel as a function of a primary velocity of the tape at the head and a secondary velocity of the tape at the inboard reel and/or a secondary velocity of the tape at the outboard reel.

Typically, a tape is organized into multiple data tracks in parallel to each other. The head may comprise multiple read and/or write elements wherein each read and/or write element during a read and/or write operation is assigned to one of the data tracks to read and/or write data from/to. The number of data tracks on the tape usually exceeds the number of read/write elements available at the head. Hence, at a given longitudinal position of the tape, for example, at the end of the tape, the tape drive may reverse the direction of tape motion, preferably by reversing the direction the reels are driven, and the head including the read/write elements may be laterally offset from the present position, preferably by the width of at least one data track, so that all data tracks may be read by letting the head move relative to the tape in a serpentine fashion. Therefore, the role of a reel being a supply reel or a take-up reel depends on the direction of tape motion.

The term "supply reel" in this context may refer to the reel supplying the tape. The term "take-up reel" in this context may refer to the reel taking the tape or, in other words, to the reel to which the tape is supplied. When the direction of the transport or movement of the tape is changed, the former supply reel becomes the take-up reel and the former take-up reel becomes the supply reel. The reels are also referred to as "inboard reel" and "outboard reel". These expressions refer to the position of the reels, i.e., inside the drive system (inboard) or outside the drive system (outboard). The inboard reel may be either the take-up reel or the supply reel and the outboard reel may be the other one of the supply reel or the take-up reel, for forward and reverse tape motion direction, respectively.

In embodiments, the control device comprises a first input terminal being adapted to receive a primary velocity of the tape being indicative for a velocity of the tape at the position of the head between the outboard reel and the inboard reel, a second input terminal being adapted to receive a secondary velocity of the tape being indicative for a velocity of the tape at the inboard reel and/or the outboard reel, and a velocity adjustment unit being adapted to adjust the velocity of the outboard reel and the velocity of the inboard reel based on both the primary velocity and the secondary velocity in order to control the transport of the tape.

In order to provide an improved capacity of a tape, for instance a magnetic tape for a tape storage system, a reliable control of the transport of the tape and thus of the tension of the tape is achieved. For providing an improved capacity of the tape, the tension of the tape should not vary, thus the tape deformation should be minimized. As the tension of the tape interrelates with the velocities of the outboard reel and the inboard reel, a reliable and improved control of the velocities of the reels may provide a, at least substantially, constant tension of the tape. Thereby, larger volumetric recording densities may be achieved as the tape may be thinner and tape speed variations and tape deformation may be reduced.

Conventionally, the velocity of the tape during cruise mode is measured only at the position of the head, and the velocities of the reels are controlled based only on this one velocity. A typical cruise velocity can be between 1 and 7 m/s. However, the velocities of the reels may differ from each other, and the velocity measured at the position of the head may correspond to the velocity of only one reel, namely the supply reel. Thus, if the velocities of the reels are adjusted, for instance by a feedback control, based on this one measured velocity, the adjustment may be without effect or even supplying an error to the reels or at least one reel. This may be the case as the velocity of one reel may be adjusted by a signal being based on a wrong velocity, i.e., a velocity corresponding to the other reel.

Thus, embodiments of the control device and a corresponding control method use the fact that the velocities of the reels may differ from each other. Therefore, by using the primary velocity and the secondary velocities, this difference may be taken into account when controlling the velocities of the supply reel and the take-up reel. In a preferred embodiment, the control device and method assume that the tape velocity as observed at the head is mainly determined by the reel supplying the tape. This finding is in contrast to the assumption usually made that the primary velocity response is the average of the velocity responses at the individual reels.

"Head" in this context refers to the element of the system capable of reading data from and/or writing data to the tape. The head is arranged at a position between the outboard reel and the inboard reel.

According to an embodiment, the velocity adjustment unit is adapted to adjust the velocity of the outboard reel based on the primary velocity and to adjust the velocity of the inboard reel based on the secondary velocity in forward direction and to adjust the velocity of the inboard reel based on the primary direction and to adjust the velocity of the outboard reel based on the secondary velocity in reverse direction.

As the primary velocity corresponds to the velocity of the supply reel, although measured at the head, the primary velocity may be used for controlling the velocity of the supply reel, i.e. the outboard reel in forward direction and the inboard reel in reverse direction. On the other hand, as the velocity of the take-up reel does not correspond, in most of the cases, to the primary velocity being measured at the head, the velocity of the take-up reel may be controlled based on the secondary velocity measured at the take-up reel, i.e. the inboard reel in forward direction and the outboard reel in reverse direction.

According to a further embodiment, the velocity adjustment unit is adapted to adjust the velocity of the outboard reel and the velocity of the inboard reel during a cruise mode.

The term "cruise" mode may refer to a mode in which the transport velocity of the tape is constant. Such a mode may be used for instance for reading, writing and other operations. In particular during the cruise mode, a constant velocity and constant tension may be necessary. However, the control device may also be used during other modes.

According to a further embodiment, the primary velocity is measured at the head using (pre-formatted) servo information.

The (read and write) head may comprise servo read, data read, and data write elements, i.e. transducer elements. Data tracks are written on the tape parallel to and interleaved with servo tracks. The servo read elements read the servo information stored in the servo tracks, which is then used for aligning the head with the data tracks on the tape. The servo information may then be used for measuring the primary velocity.

According to a further embodiment, the control device further comprises at least one sensor being arranged at the inboard reel and or the outboard reel for measuring the secondary velocity. According to a further embodiment, the at least one sensor is a Hall sensor.

The velocity of the inboard reel or the outboard reel may be measured using sensors. These sensors, or at least one sensor, may be arranged directly at the respective reel. The sensor may be a Hall sensor. As Hall sensors may be already present in such a transport system, these sensors may also be used by the control device so that no further sensors are required.

According to a further embodiment, the control device further comprises a third input terminal being adapted to receive a further secondary velocity of the tape being indicative for the velocity of the tape at the other one of the supply reel and/or the take-up reel.

According to this embodiment, two secondary velocities may be determined, one of the supply reel and one of the take-up reel. The velocities may be determined by using sensors being arranged at the respective reels.

According to a further embodiment, the control device further comprises a calculation unit being adapted to calculate a further secondary velocity being indicative for the velocity of the tape at the other one of the outboard reel and/or the inboard reel based on the secondary velocity.

The calculation unit may take into account that the angular velocities of the outboard reel and the inboard reel are not identical, e.g. they may have different frequency characteristics, e.g., the variation of the outboard reel and inboard reel angular velocities may incur substantially inverted frequency characteristics of the secondary velocities with respect to the operation time. This may be due to the inverted change of the radius of the outboard reel and the inboard reel during tape motion. The supply reel, for instance the outboard reel, has an effectively decreasing radius due to the supply of the tape. Thus, the angular velocity of the supply reel may need to be increased. At the same time, the take-up reel, for instance the inboard reel, has an effectively increasing radius due to the supplied tape, and thus the angular velocity of the take-up reel may need to be decreased. Based on this inverted behaviour, the angular velocity of one reel may be calculated as a function of the velocity of the other reel. The angular velocity of a reel is reel radius dependent whereas the secondary velocity of a reel is a measure of the linear tape velocity at the reel and is essentially independent of the reel radius.

According to a further embodiment, the velocity adjustment unit is adapted to adjust the velocity of the outboard reel and the velocity of the inboard reel based on the primary velocity, the secondary velocity and the further secondary velocity.

When using the primary velocity and both secondary velocities, the control of the transport may be improved as the actual velocities are used and there is no a priori assumption of any velocity.

According to a further embodiment, the velocity adjustment unit is adapted to determine the direction of the tape movement and to adjust the velocity of the outboard reel and the velocity of the inboard reel based on the primary velocity and the secondary velocity or the further secondary velocity based on the determined direction.

As the direction of the tape influences the interrelation between the primary velocity and the velocity of the take-up reel and the supply reel, the direction may be determined for selecting the velocity to be used as secondary velocity. For instance, the direction may be supplied as a direction flag to the control device. In any case, the secondary velocity to be considered may be the velocity at the take-up reel as the velocity at the supply reel and the velocity at the head may be considered as being essentially identical.

According to a further embodiment, the velocity adjustment unit comprises an estimation unit being adapted to estimate a first control signal and a second control signal based on the primary velocity, the secondary velocity and the further secondary velocity, the first control signal and the second control signal being adapted to adjust the velocity of the outboard reel and the velocity of the inboard reel.

When using such a velocity estimation unit, the control may be further improved as all three velocities may be considered.

The estimation unit may contain any rule that provides an inboard reel velocity estimate and an outboard reel velocity estimate based on observed data, e.g., primary and secondary velocities, inboard and outboard reel motor currents, tape motion direction, and tape tension. The estimation unit may be for example a Kalman estimator.

According to an embodiment of a second aspect, a tape transport system is suggested. The tape transport system comprises a head being operable to read data from and/or write data to the tape, an outboard reel, an inboard reel, wherein the tape is moveable from the outboard reel to the inboard reel in forward direction or from the inboard reel to the outboard reel in reverse direction, and a control device as described above for controlling the transport of the tape within the tape transport system.

According to an embodiment of a third aspect, a method for controlling the transport of a tape within a tape transport system is suggested. The tape transport system has a head being operable to read data from and/or write data to the tape, an outboard reel and an inboard reel, wherein the tape is moveable from the outboard reel to the inboard reel in forward direction and from the inboard reel to the outboard reel in reverse direction. The method comprises the step of controlling the velocity of the outboard reel and the velocity of the inboard reel as a function of a primary velocity of the tape at the head and a secondary velocity of the tape at the inboard reel and/or a secondary velocity of the tape at the outboard reel.

The method may comprise one or more of the steps of:
receiving a primary velocity of the tape being measured at the position of the head between the outboard reel and the inboard reel;
receiving a secondary velocity of the tape being measured at the inboard reel and/or the outboard reel, and
adjusting the velocity of the outboard reel and the velocity of the inboard reel based on both the primary velocity and the secondary velocity in order to control the transport of the tape.

According to an embodiment, controlling the transport of the tape includes controlling the tension of the tape.

The velocities of the outboard reel and the inboard reel are responsible for the tension of the tape, i.e., are interrelated. As explained above, it may be necessary to control the tension of the tape as the tension is responsible for the width of the tape. When the tension is higher, the tape may be narrower, when the tension is lower, the tape may be wider. Thus, as the exact position of data on the tape is important for reading data from and/or writing data to the tape in a reliable manner, the tension should be controlled. By controlling the velocities of the reels, the tension may be controlled.

According to an embodiment of a fourth aspect, a computer program is suggested. The computer program comprises a program code for executing the method as described above for controlling the transport of a tape within a tape transport system when run on at least one computer.

The program code may be configured to implement further aspects or steps of the method for allocating energy to devices. The program code can be distributed among the elements forming the system.

The computer program product, for instance, includes computer readable code for implementing aspects of the method tape transport control depicted above.

Certain embodiments of the presented control device, the tape transport system, the method for controlling or the computer program may comprise individual or combined features, method steps or aspects as mentioned above or below with respect to exemplary embodiments.

In the following, embodiments of methods and devices relating to tape transport control are described with reference to the enclosed drawings.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
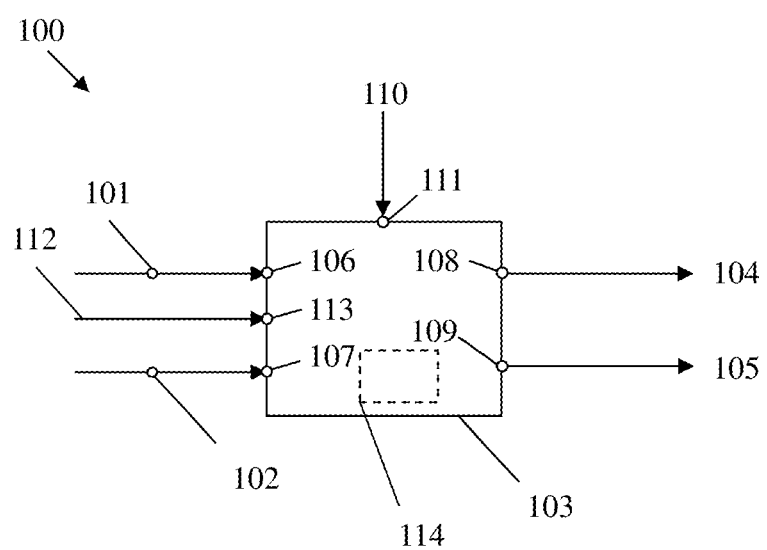
FIG. 1 shows a schematic block diagram of a first embodiment of a control device for controlling the transport of a tape within a tape transport system.

In FIG. 1, a control device 100 for controlling the transport of a tape 208 within a tape transport system 200 (see FIG. 2) is shown.

The control device 100 comprises a first input terminal 106 for receiving a primary velocity 101 of the tape 208 being indicative for a velocity of the tape 208 at the position of the head 203 between the outboard reel 206 and the inboard reel 207. The control device 100 comprises further a second input terminal 107 for receiving at least one secondary velocity 102 and a third input terminal 113 for receiving at least another secondary velocity 112 of the tape 208. The secondary velocity 102 corresponds to a velocity of the tape 208 at the inboard reel 207 and secondary velocity 112 corresponds to a velocity of the tape 208 at the outboard reel 206. The control device 100 comprises further a fourth input terminal 111 for receiving a direction flag 110 which indicates the direction of tape motion. The fourth input terminal 111 and the direction flag 110 are optional and the direction can also be determined otherwise. In order to control the transport of the tape 208, the control device 100 is adapted to adjust the velocity of the outboard reel 206 and the inboard reel 207. In one embodiment, the outboard reel 206 is controlled by a control signal 105 which is output via an output terminal 109, whereas the inboard reel 207 is controlled by a control signal 104 which is output via an output terminal 108. In this embodiment, if the tape motion is in the forward direction FW, i.e., the tape is moved from the outboard reel 206 to the inboard reel 207, the control signal 105 is based on the primary velocity 101, whereas the control signal 104 is based on the inboard reel secondary velocity 102; if the tape motion is in the reverse direction BW, i.e., the tape is moved from the inboard reel 207 to the outboard reel 206, the control signal 105 is based on the outboard reel secondary velocity 112, whereas the control signal 104 is based on the primary velocity 101. The control device 100 optionally includes a calculation unit 114 for calculating the outboard reel secondary velocity 112 as a function of the inboard reel secondary velocity 102.

Figure 2:
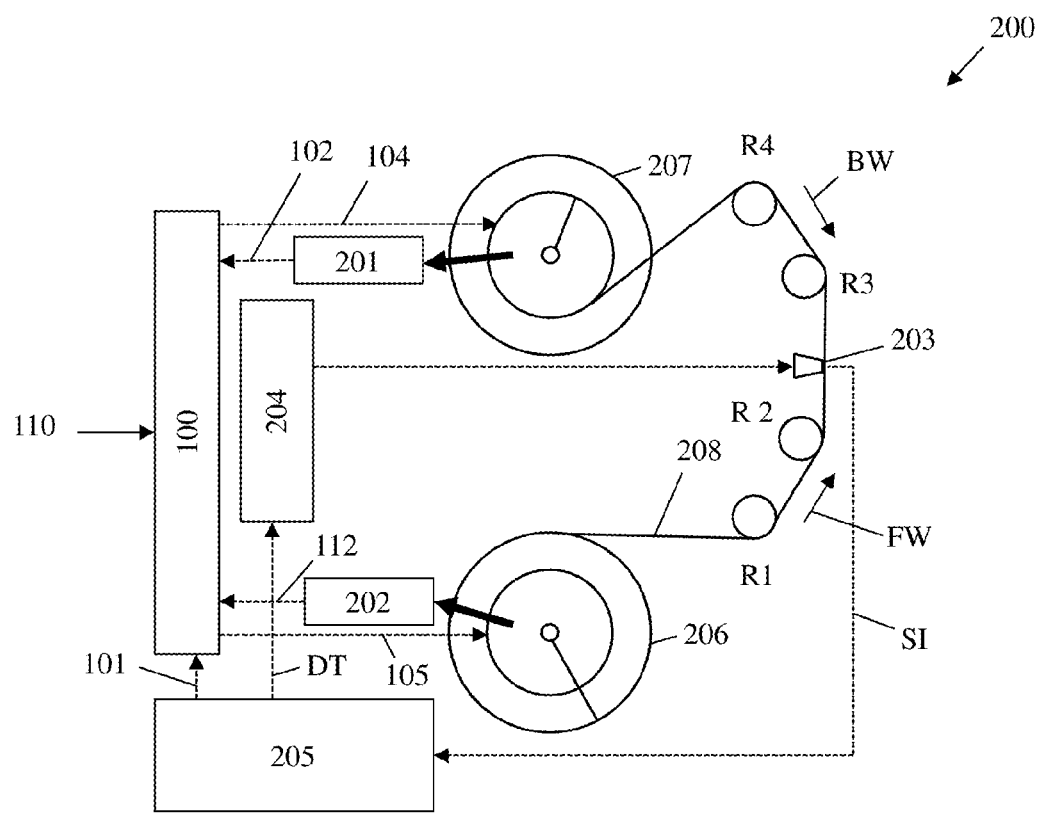
FIG. 2 shows a schematic block diagram of a first embodiment of a tape transport system comprising a control device for controlling the transport of a tape within a tape transport system.

An exemplary tape transport system 200 is shown in FIG. 2. The tape transport system 200 is used for transporting a tape 208 in order to perform read, write, seek, or other operations on the tape 208. The tape transport system 200 has a head 203 operable to read data from and/or write data to the tape 208. An outboard reel 206 and an inboard reel 207 are used to transport or move the tape 208 from the outboard reel 206 to the inboard reel 207 in forward direction, and from the inboard reel 207 to the outboard reel 206 in reverse direction. The tape 208 is guided over rollers R1-R4. Sensors 201 and 202 can be used to provide secondary velocities 102, 112 being measured by the sensors 201 and 202. The secondary velocities 102, 112 correspond to velocities of the tape 208 at the respective reel 207, 206. The sensors 201, 202 are Hall sensors, for example. The arrow FW denotes a nominal forward direction of the tape 208, and BW a movement in the reverse direction. In forward mode, the outboard reel 206 functions as a supply reel. Tape 208 is supplied from the outboard reel 206, via rollers R1, R2 to the head 203 via rollers R3, R4 to the inboard reel 207, which functions as the take-up reel, where tape 208 is wound up again. The tape 208 runs along a forward path as indicated.

The head 203 reads servo information SI from the tape 208. The servo information SI is provided to a servo channel 205. The servo channel 205 provides a primary velocity 101 derived from the servo information SI to the control device 100. In addition, the servo channel 205 provides data DT relating to the servo information SI to a track follow control module 204, which is implemented to adjust the position of the head 203 in response to this information.

The control device 100 as shown in FIG. 1 is adapted to receive the primary velocity 101 of the tape 208 being indicative for a velocity of the tape 208 at the position of the head 203 between the outboard reel 206 and the inboard reel 207. The control device 100 receives the secondary velocities 102, 112 of the tape 208 being indicative for a velocity of the tape 208 at the inboard reel 207 and at the outboard reel 206, respectively. Subsequently, the control device 100 adjusts the velocity of the outboard reel 206 and the velocity of the inboard reel 207 as a function of the primary velocity 101 and the secondary velocities 102, 112. The adjustment may be performed for instance in a velocity adjustment unit 103.

As explained above, the control of the velocities of the outboard reel 206 and the inboard reel 207 is based on the fact that the velocity of the tape 208 at the head, i.e., the primary velocity, is mostly determined in forward direction FW by the velocity of the outboard reel 206, whereas it is mostly determined in reverse direction BW by the velocity of the inboard reel 207. Thus, for the control of the tape 208, i.e., the control of the outboard reel 206 and the inboard reel 207, the primary velocity 101 at the head 203 and at least the velocity at the inboard reel 207 should be considered for tape motion in forward direction FW. The control device 100 as shown above utilizes the primary velocity 101 for the control of the outboard reel 206 and the secondary velocity 102, i.e., the velocity measured at the inboard reel 207, for the control of the inboard reel 207.

Figure 3:
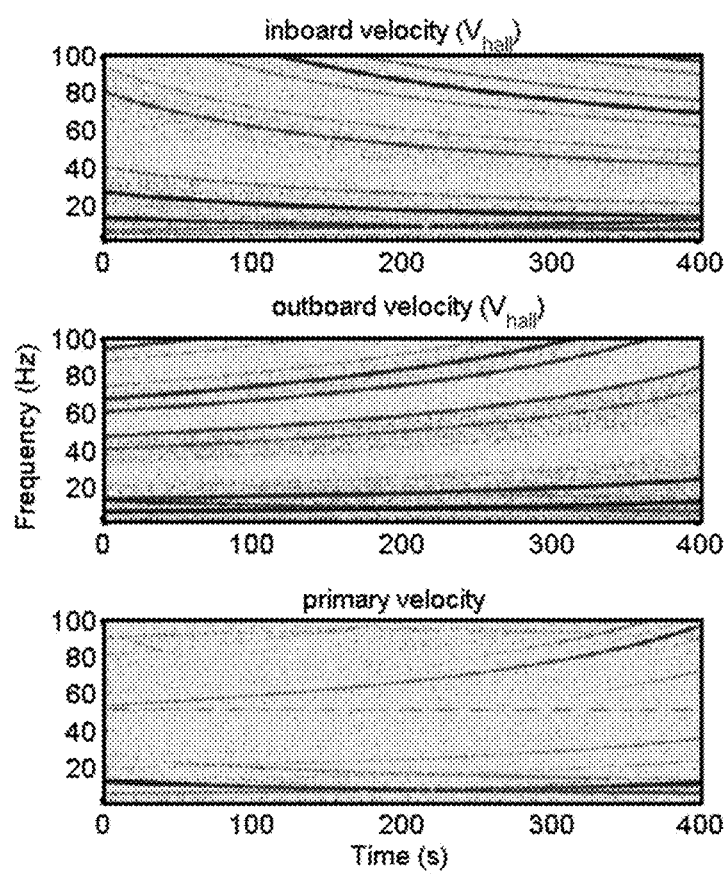
FIG. 3 shows diagrams illustrating different frequency characteristics of velocities along the length of the tape measured at different positions within the tape transport system.

The correspondence between the primary velocity 101 and the secondary velocities at the inboard reel 207 and the outboard reel 206 is shown in FIG. 3.

FIG. 3 illustrates a spectral analysis of the frequency content of the different velocity measurements versus time. Large spectral content is shown as black curves, whereas small spectral content is shown in light grey color. FIG. 3 shows that the spectral components of the velocity of the inboard reel 207 (acting as take-up reel, shown in the upper diagram) show a different behavior with respect to the spectral components of the velocity of the outboard reel 206 (acting as supply reel, shown in the middle diagram). The frequency components induced by the inboard reel 207 tend towards lower frequencies with elapsing time, indicating that the inboard reel radius increases with time as the reel acts as take-up reel. The frequency components induced by the outboard reel 206 tend towards higher frequencies with elapsing time, indicating that the outboard reel radius decreases with time as the reel acts as supply reel. The frequency components of the primary velocity 101 tend towards higher frequencies with elapsing time, indicating a strong effect of the velocity of the outboard reel 206 (or more generally the supply reel) on the primary velocity 101. Hence, the primary velocity 101 at the head 203 essentially corresponds to the velocity of the outboard reel 206 (shown in the lower diagram) in the case of forward tape motion. Based on FIG. 3 it can be seen that using the primary velocity 101 to control both reels may lead to adjustment errors of the velocities. A corresponding tape transport system 500 is shown in FIG. 4.

Figure 4:
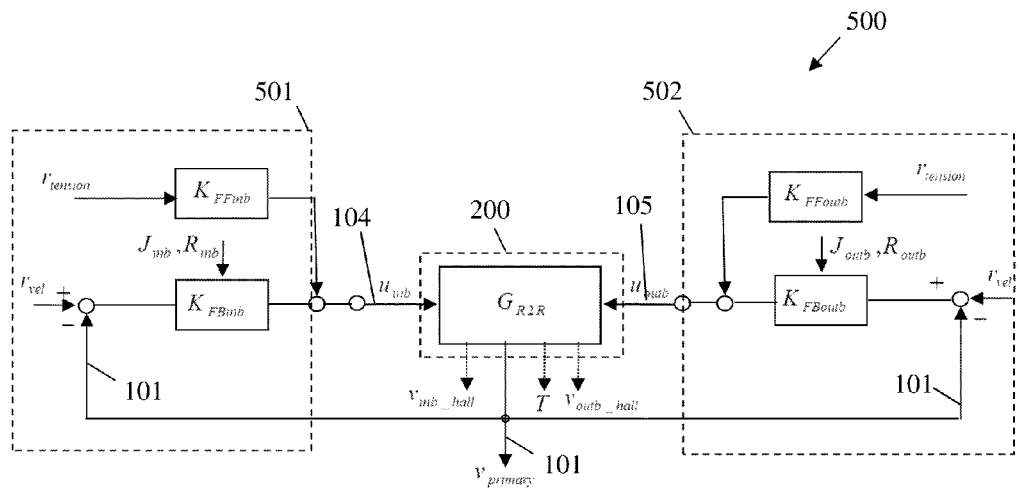
FIG. 4 shows a diagram of a comparative tape transport system.

FIG. 4 shows a tape transport control system 500 in closed loop configuration in which the primary velocity 101 is utilized both as outboard reel velocity estimate for the outboard reel 206 and as inboard reel velocity estimate for the inboard reel 207. The tape transport control system 500 comprises an inboard reel controller 501 and an outboard reel controller 502. Each controller 501, 502 implements a controller function $K_{FF}$ receiving a feed-forward reference value of the tension $r_{tension}$ of the tape 208. The controllers 501, 502 each implement a further controller function $K_{FB}$ receiving a feedback signal for the velocity $r_{vel}$-$v_{primary}$, and input parameters for the inertia J and the radius R of the respective reel.

Based on these variables and using the controller functions, the inboard reel controller 501 and the outboard reel controller 502 each determine a respective control current 104 and 105, here called inboard current $u_{inb}$ and outboard current $u_{outb}$. The tape transport system 200 determines different parameters based on these inputs. However, in this system, only the primary velocity $v_{primary}$ 101 is used as a feedback signal. This can lead to inaccurate reel velocity adjustments as explained above.

Figure 5:
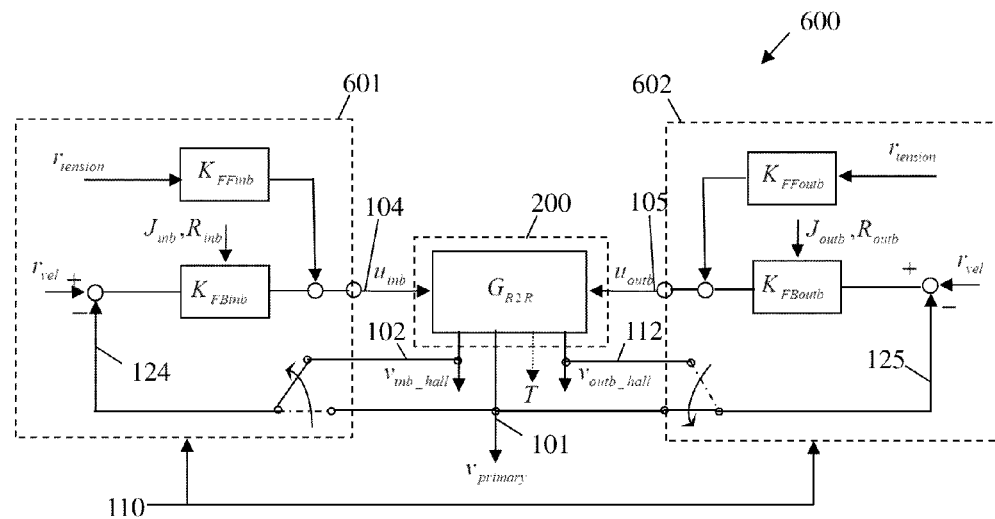
FIG. 5 shows a diagram of a second embodiment of a tape transport system comprising a control device for controlling the transport of a tape within a tape transport system.

In order to improve the control of the reel speeds and to minimize velocity and tension variations, which may be based on inaccurate control inputs, the tape transport system 200 can use, in addition to a primary velocity $v_{primary}$ 101, at least one secondary velocity measurement $v_{secondary}$ 102, 112. This is illustrated in terms of a tape transport control system 600 in FIG. 5. The inboard reel controller 601 and the outboard reel controller 602 (corresponding to the reel controllers 501, 502) receive, in forward tape direction, the secondary velocity 102 associated with the inboard reel as inboard reel velocity estimate 124 and the primary velocity 101 as outboard reel velocity estimate 125. Likewise, in reverse tape motion direction the inboard reel controller 601 and the outboard reel controller 602 (corresponding to the reel controllers 501, 502) receive the primary velocity 101 as inboard reel velocity estimate 124 and the secondary velocity 112 associated with the outboard reel as outboard reel velocity estimate 125. The direction dependent switching is indicated by the dotted lines.

Figure 6:
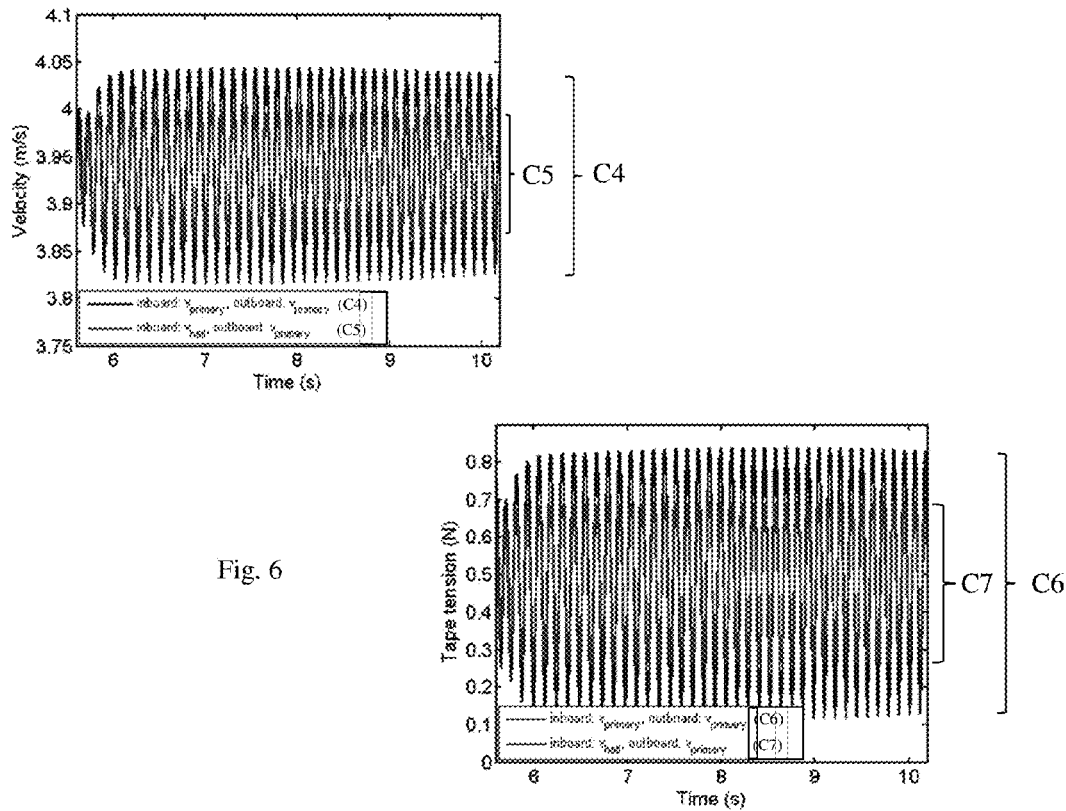
FIG. 6 shows two graphs illustrating velocity variations and tension variations using the control device of FIG. 1 and using a common control.

Using the primary velocity 101 and at least one secondary velocity 102, 112 as inboard and outboard reel velocity estimates 124, 125 for the control process of the reels 207, 206 leads to an improved velocity and tension control of the tape 208. This can be seen in FIG. 6. Here, the left/upper diagram illustrates the velocity variations using the primary velocity 101 as input for both controllers 501, 502 (curve C4) and using the primary velocity 101 as outboard reel velocity estimate 125 for controller 602 and the secondary velocity 102 associated with the inboard reel as inboard reel velocity estimate 124 for controller 601 (curve C5) in forward tape motion direction. The curve C5 (smaller amplitudes) shows reduced velocity variations compared with C4 (greater amplitudes).

The right/lower diagram illustrates the tension variations using the primary velocity 101 as input for both controllers 501, 502 (curve C6) and using the primary velocity 101 as outboard reel velocity estimate 125 for controller 602 and the secondary velocity 102 associated with the inboard reel as inboard reel velocity estimate 124 for controller 601 (curve C7) in forward tape motion direction. The curve C7 (smaller amplitudes) shows reduced tension variations compared with C6 (greater amplitudes).

Figure 7:
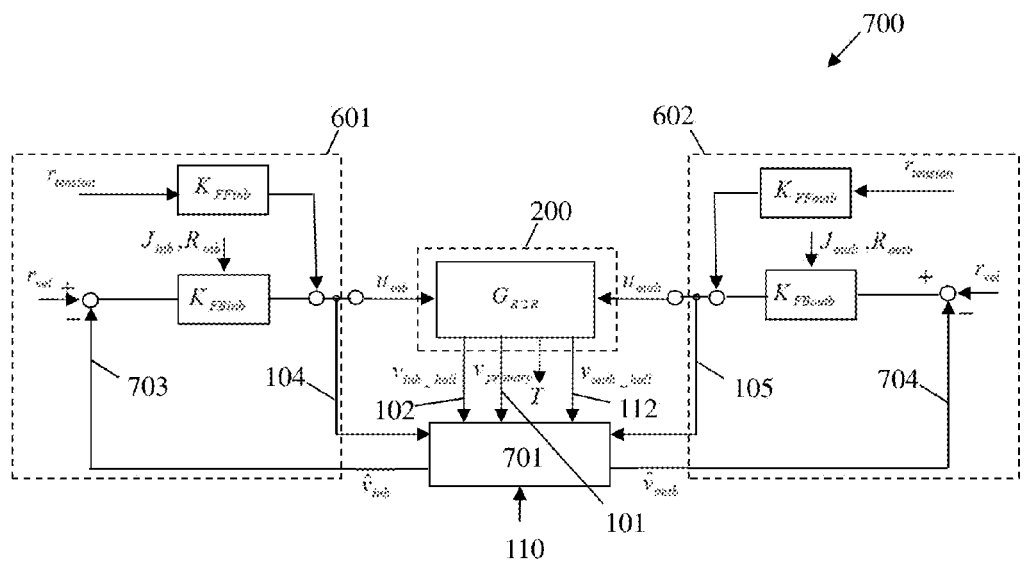
FIG. 7 shows a diagram of a third embodiment of a tape transport system comprising a control device for controlling the transport of a tape within a tape transport system.

A further exemplary tape transport control system 700 is shown in FIG. 7. Here, an additional estimation unit 701 is provided. Based on the secondary velocities 102, 112 measured at the inboard reel 207 and the outboard reel 206, the primary velocity 101, and a direction flag 110 of the motion of the tape 208, the estimation unit 701 generates an inboard reel velocity estimate 703 and an outboard reel velocity estimate 704 for the controllers 601, 602. According to this embodiment, the variations of the velocity and/or tension can be further reduced, and a more accurate calculation of reel velocity estimates 703, 704 is realized with the estimation unit 701.

Figure 8:
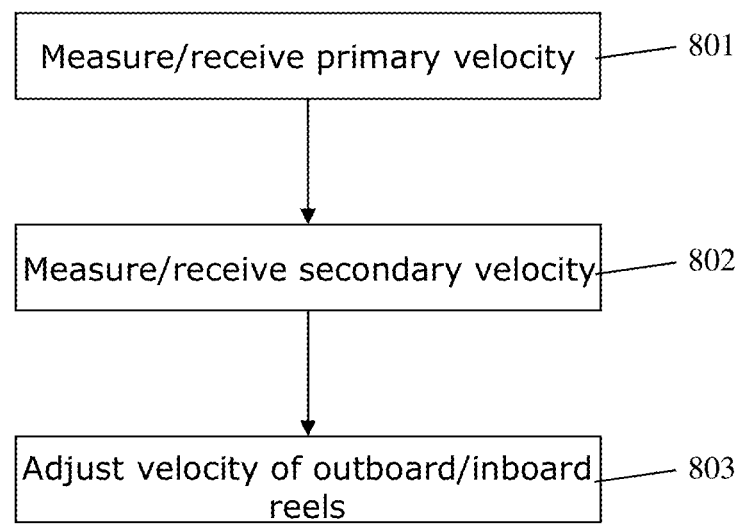
FIG. 8 shows an embodiment of a sequence of method steps for controlling the transport of a tape within a tape transport system.

FIG. 8 shows a diagram illustrating method steps involved in a method for controlling the transport of a tape 208 within a tape transport system 200. The method comprises adjusting 803 the velocity of the outboard reel 206 and the velocity of the inboard reel 207 as a function of a primary velocity 101 of the tape 208 being measured at the position of the head 203 and at least one secondary velocity 102, 112 of the tape 208 being measured at the inboard reel 207 and/or the outboard reel 206. Optionally, the primary velocity can be measured and/or received 801 by the control device 100 and at least one secondary velocity 102, 112 can be measured and/or received 802 by the control device 100.

The velocities can be determined or measured using a variety of techniques. As explained above, servo information may be used for determining the primary velocity 101. Information derived from any kind of sensors may be used for determining the secondary velocity 102, 112.

The above described method and also the control device 100 can be implemented using computerized devices which can be suitably designed for implementing embodiments of the present invention as described herein. In that respect, it can be appreciated that the methods described herein are largely non-interactive and automated. In exemplary embodiments, the method described herein can be implemented either in an interactive, partly-interactive or non-interactive system. The method described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 8 or the control device 100, e.g., of FIG. 1, may be implemented in software, as an executable program, the latter executed by suitable digital processing devices. More generally, embodiments of the present invention can be implemented, wherein general-purpose digital computers, such as personal computers, workstations, etc., are used.

Figure 9:
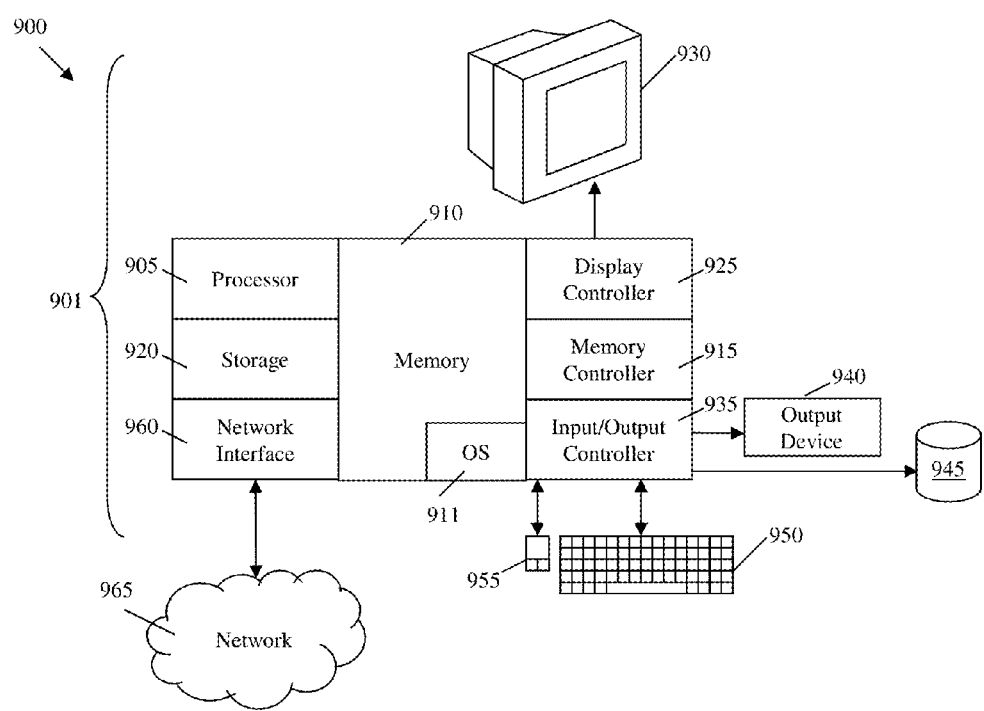
FIG. 9 shows a schematic diagram of an embodiment of a system adapted for controlling the transport of a tape.

For instance, the system 900 depicted in FIG. 9 schematically represents a computerized unit 901, e.g., a general-purpose computer. In exemplary embodiments, in terms of hardware architecture, as shown in FIG. 9, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the method as described herein (e.g., FIG. 8) or the control device as described herein (e.g. FIG. 1), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965. For instance, the control device 100 of FIG. 1 may be controlled via a network 965 when used in a tape library.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated. The control device 100 may be part of the unit 901.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the method described herein (e.g. with reference to FIG. 8) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS 100 control device
101 primary velocity
102 secondary velocity (associated with inboard reel)
103 velocity adjustment unit
104 inboard reel control signal
105 outboard reel control signal
106 input terminal
107 input terminal
108 output terminal
109 output terminal
110 direction flag
111 input terminal
112 secondary velocity (associated with outboard reel)
113 input terminal
114 calculation unit
124 inboard reel velocity estimate
125 outboard reel velocity estimate
200 tape transport system
201 sensor
202 sensor
203 head
204 track follow control module
205 front-end servo channel module
206 outboard reel
207 inboard reel
208 tape
500 tape transport control system
501 inboard reel controller
502 outboard reel controller
600 tape transport control system
601 inboard reel controller
602 outboard reel controller
700 tape transport control system
701 estimation unit
703 control signal
704 control signal
801-803 method steps
900 system
901 computerized unit
905 processor
910 memory
911 operating system (OS)
915 memory controller
920 storage
925 display controller
940 display
945, 950, 955 input and/or output (I/O) devices
935 local input/output controller
950 keyboard
955 mouse
960 network interface or transceiver
965 network
C4 velocity variations using primary velocity for both controllers
C5 velocity variations using primary velocity and secondary velocity for the controllers
C6 tension variations using primary velocity for both controllers
C7 tension variations using primary velocity and secondary velocity for the controllers
FW forward direction
BW reverse direction
R1-R4 roller
SI servo information
DT data

The invention claimed is:

1. A control device for controlling the transport of a tape within a tape transport system, the tape transport system having:
a head being operable to read data from and/or write data to the tape;
an outboard reel and an inboard reel;
wherein the tape is moveable from the outboard reel to the inboard reel in forward direction, or from the inboard reel to the outboard reel in reverse direction; and wherein the control device is adapted to, during a cruise mode, receive a feedback signal comprising velocity information and input parameters comprising inertia information and a radius of a respective one or more of the outboard reel and the inboard reel, and generate control signals to control the velocity of the outboard reel and the velocity of the inboard reel as a function of a primary velocity of the tape at the head and a secondary velocity of the tape at the inboard reel and/or a secondary velocity of the tape at the outboard reel, based on the velocity information and the parameters such that the tape is not deformed in length or thickness;

a first input terminal adapted to receive the primary velocity of the tape indicative for a velocity of the tape at the position of the head between the outboard reel and the inboard reel; and a second input terminal adapted to receive a secondary velocity of the tape indicative for a velocity of the tape at the inboard reel and/or outboard reel.

2. The control device of claim 1, further comprising:
a velocity adjustment unit adapted to adjust the velocity of the outboard reel and the velocity of the inboard reel based on both the primary velocity and the secondary velocity in order to control the transport of the tape.

3. The control device of claim 2, wherein the velocity adjustment unit is adapted to adjust the velocity of the outboard reel based on the primary velocity and to adjust the velocity of the inboard reel based on the secondary velocity in forward direction and to adjust the velocity of the inboard reel based on the primary velocity and to adjust the velocity of the outboard reel based on the secondary velocity in reverse direction.

4. The control device of claim 1, wherein the primary velocity is measured at the head using servo information.

5. The control device of claim 1, further comprising at least one sensor arranged at the inboard reel and/or the outboard reel for measuring the secondary velocity.

6. The control device of claim 5, wherein the at least one sensor comprises a Hall sensor.

7. The control device of claim 2, further comprising a third input terminal adapted to receive a further secondary velocity of the tape being indicative for the velocity of the tape at the other one of the outboard reel and/or the inboard reel.

8. The control device of claim 1, further comprising a calculation unit adapted to calculate a further secondary velocity of the tape being indicative for the velocity of the tape at the other one of the outboard reel and/or the inboard reel based on the secondary velocity.

9. The control device of claim 2, wherein the velocity adjustment unit is adapted to adjust the velocity of the outboard reel and the velocity of the inboard reel based on the primary velocity, the secondary velocity and the further secondary velocity.

10. The control device of claim 2, wherein the velocity adjustment unit is adapted to determine the direction of the tape movement and to adjust the velocity of the outboard reel and the velocity of the inboard reel based on the primary velocity and the secondary velocity or the further secondary velocity based on the determined direction.

11. The control device of claim 7, wherein the velocity adjustment unit comprises an estimation unit adapted to estimate a first control signal and a second control signal based on the primary velocity, the secondary velocity and the further secondary velocity, the first control signal and the second control signal being adapted to adjust the velocity of the outboard reel and the velocity of the inboard reel.

12. A tape transport system, comprising:
a head being operable to read data from and/or write data to the tape;
an outboard reel;
an inboard reel, wherein the tape is moveable from the outboard reel to the inboard reel in forward direction and from the inboard reel to the outboard reel in reverse direction; and
a control device of claim 1 for controlling the transport of the tape within the tape transport system.

13. A computer-implemented method for controlling, via a processor, the transport of a tape within a tape transport system, the tape transport system having
reading data from a head, wherein the head is operable to read data from and/or write data to the tape;
moving, via the processor, from the outboard reel to the inboard reel in forward direction, or from the inboard reel to the outboard reel in reverse direction,
the method comprising:
receiving, via the processor, a feedback signal during a cruise mode, wherein the feedback signal comprises velocity information and input parameters comprising inertia information and a radius of a respective one or more of the outboard reel and the inboard reel;
controlling, via the processor, the velocity of the outboard reel and the velocity of the inboard reel as a function of a primary velocity of the tape at the head and a secondary velocity of the tape at the inboard reel and/or a secondary velocity of the tape at the outboard reel, based on the velocity information and the parameters such that the tape is not deformed in length or thickness;
receiving, via the processor, the primary velocity of the tape indicative for a velocity of the tape at the position of the head between the outboard reel and the inboard reel; and
receiving, via the processor, a secondary velocity of the tape indicative for a velocity of the tape at the inboard reel and/or outboard reel.

14. The computer-implemented method of claim 13, further comprising at least one of:
measuring the primary velocity of the tape at the head between the outboard reel and the inboard reel;
measuring the secondary velocity of the tape at the inboard reel and/or the outboard reel; and
adjusting the velocity of the outboard reel and the velocity of the inboard reel as a function of the primary velocity and the secondary velocity for controlling the transport of the tape.

15. The computer-implemented of claim 13, wherein controlling the transport of the tape comprises controlling the tension of the tape.

16. A non-transitory computer-readable storage medium comprising computer-executable program instructions instructions for, when executed by the processor, performing a method for controlling the transport of a tape within a tape transport system the method comprising:
reading, via the processor, data from a head, wherein the head is operable to read data from and/or write data to the tape;
moving, via the processor, from an outboard reel to the inboard reel in forward direction, or from the inboard reel to the outboard reel in reverse direction;
receiving, via the processor, a feedback signal during a cruise mode, wherein the feedback signal comprises velocity information and input parameters comprising inertia information and a radius of a respective one or more of the outboard reel and the inboard reel;

controlling, via the processor, the velocity of the outboard reel and the velocity of the inboard reel as a function of a primary velocity of the tape at the head and a secondary velocity of the tape at the inboard reel and/or a secondary velocity of the tape at the outboard reel, based on the velocity information and the parameters such that the tape is not deformed in length or thickness;

receiving, via the processor, the primary velocity of the tape indicative for a velocity of the tape at the position of the head between the outboard reel and the inboard reel; and receiving, via the processor, a secondary velocity of the tape indicative for a velocity of the tape at the inboard reel and/or outboard reel.

* * * * *